(12) United States Patent
Monteiro et al.

(10) Patent No.: US 7,165,127 B2
(45) Date of Patent: Jan. 16, 2007

(54) FLOW CONTROL FOR INTERFACES PROVIDING RETRANSMISSION

(75) Inventors: Anand C. Monteiro, San Diego, CA (US); Linley Young, San Diego, CA (US)

(73) Assignee: VIA Telecom Co., Ltd., Grand Cayman (KN)

( * ) Notice: Subject to any disclaimer, the term of this patent is extended or adjusted under 35 U.S.C. 154(b) by 382 days.

(21) Appl. No.: 10/686,685

(22) Filed: Oct. 15, 2003

(65) Prior Publication Data

US 2005/0083836 A1   Apr. 21, 2005

(51) Int. Cl.
*G06F 13/42* (2006.01)

(52) U.S. Cl. .................. 710/29; 710/105; 709/232; 709/234; 709/235; 370/229; 714/748

(58) Field of Classification Search ............... 710/11, 710/29, 33, 48, 52; 709/1, 233–4; 711/118, 711/204, 213; 712/408; 713/500; 714/34, 714/50

See application file for complete search history.

(56) References Cited

U.S. PATENT DOCUMENTS

| | | | | |
|---|---|---|---|---|
| 6,018,787 | A | * | 1/2000 | Ip .............................. 711/100 |
| 6,023,684 | A | * | 2/2000 | Pearson .................... 705/36 R |
| 2004/0215471 | A1 | * | 10/2004 | Tamagno et al. .............. 705/1 |

* cited by examiner

*Primary Examiner*—Ilwoo Park
(74) *Attorney, Agent, or Firm*—Jaquez & Associates; William C. Boling, Esq.; Lisa M. Griffith, Esq.

(57) ABSTRACT

A method and apparatus is described, by means of which a host data communication device obtains the effects of a desired data communication protocol, such as flow control, that may not be supported by a client device. To obtain the effects of the desired protocol, the host invokes a different protocol supported by the client, for example retransmission, by presenting an appropriate protocol-initiation signal, for example by asserting an error bit on a bidirectional connection to the client. Invoking the supported protocol repetitively, if necessary, the host interprets the client response to the invocation to achieve substantially the same effect as the desired protocol. Thus, a repetitive retransmission request by the host may have the effect of a flow hold request.

14 Claims, 3 Drawing Sheets

Host Interface Device

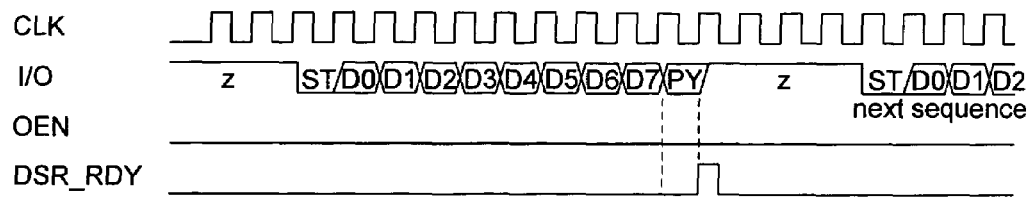
FIG. 3
FIG. 4
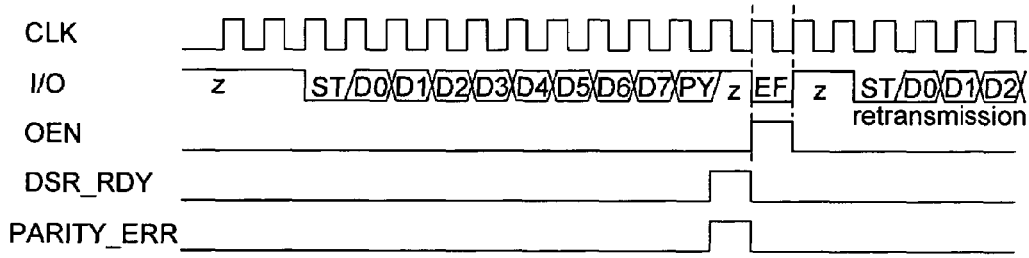
FIG. 5
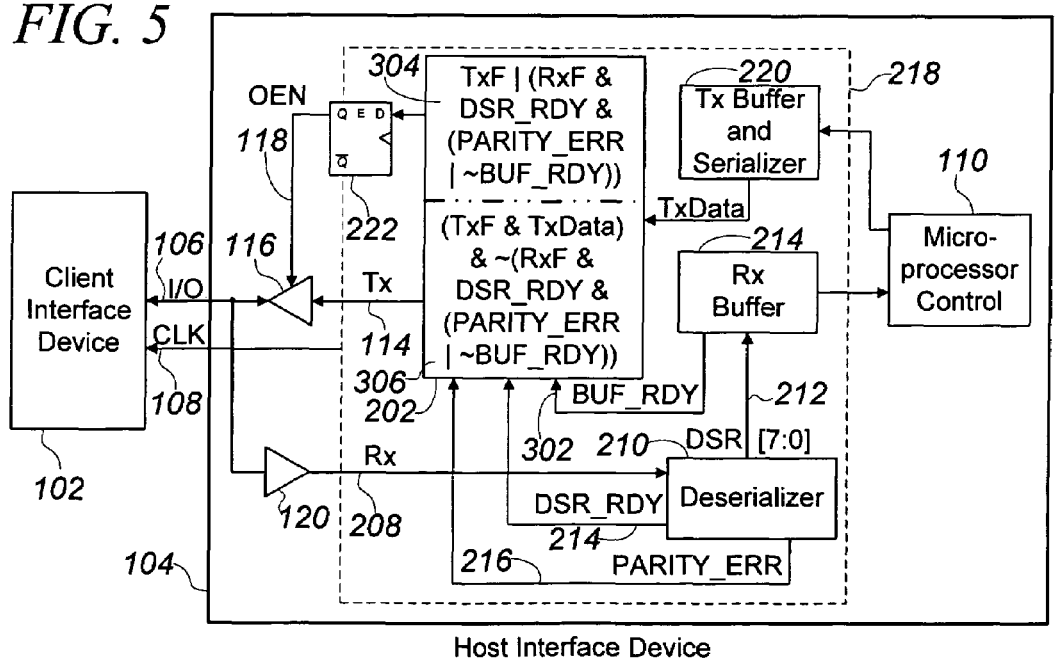

FLOW CONTROL FOR INTERFACES PROVIDING RETRANSMISSION

BACKGROUND OF THE INVENTION

1. Field of the Invention

This invention generally relates to data communication devices, and more specifically to control of data communication interfaces.

2. Related Art

Data communication interfaces are used in conjunction with a wide variety of products. In one common example, a data communication interface permits a digital camera to communicate image-descriptive data to computing and display devices, downloading data that is accumulated in order to be printed directly, or to be stored on some storage medium. As another example, in many countries, Removable User Identity Modules ("R-UIMs," also called SIM cards) commonly provide information that can be used to personalize a cellular telephone with respect to unique user information such as, for example, user identity, settings, and pre-paid airtime allocations.

Two distinct interface devices are typically employed in such data communications. For convenience, one of the interface devices is referred to herein as a "host device." The other interference device is referred to herein as a "client device." Data communications between such interface device pairs are generally bidirectional, even if one of the interface devices (e.g., a client device) serves primarily as a source of data to be communicated to the other device (e.g., a host device). An interface is required for data communications to occur between such pairs of interface devices.

As is well known, a data communication interface may be designed to support performance-enhancing features, generally at the expense of design and device complexity. For example, a need to provide high transmission speeds with low error rates may dictate that the communication interface be designed with features such as flow control and handshaking alternatives. However, in other situations, it will be desirable for an interface to be as simple as possible. For example, a client device may need to be very inexpensive to manufacture, and consequently may be designed to have only minimum features required to ensure reliable data transfer.

Because data transmissions are almost always subject to errors, even simple data communication interfaces typically provide features that permit recovery from transmission errors. One or more error notification features may be included, such as, for example, a parity error indication, together with a recovery feature, such as a capability to retransmit a block of data upon receiving notification of a transmission error. Functional data communication features of a host-client device pair are generally limited to features that are supported by both the host and the client devices.

Under some circumstances, one of the two devices involved in a data transfer (e.g., the client device) may provide minimal error recognition and response capabilities, and may entirely omit support for other useful features, such as flow control. Nonetheless, it may be desirable for the associated and corresponding device (e.g., the host device) to utilize flow control, or some other non-supported interface feature. For example, flow control features may be useful for a host interface device, permitting background data transfers to the host computing device, and thus freeing the host computing device from servicing critical interrupt service requirements that an absence of flow control might otherwise require. As another example, flow control features may permit data transfers to proceed at increased speeds, while protecting against buffer overflows, thus enabling the host device to complete data transfers more quickly than it could without these flow control features.

Thus, it is useful to incorporate performance enhancing data communication protocol features, such as flow control, in an interface device (e.g., a host device), despite an absence of support for such protocol features by a corresponding device on the other side of the interface (e.g., a client device). A method and apparatus to achieve this goal is set forth herein.

SUMMARY

A method and apparatus is described herein that enables a host interface device to effectively implement a data communication protocol feature, such as, for example, flow control, with respect to data transfers from a client interface device that does not explicitly support such protocol feature. A different protocol feature, which is supported by the client, may be invoked in such a way as to cause an effect that is substantially the same as would be provided by invocation of the unsupported protocol.

In a particular example, a client may support a retransmission protocol, for example, recognizing a transmission error signal provided by a host and consequently retransmitting previous data. The client need not expressly recognize any other data communication protocol invocation signal. The host will transmit the transmission error signal to invoke such retransmission when it recognizes a transmission error. However, during circumstances when the host device does not identify a transmission error, but would benefit from an interruption of the data flow, the host device may be configured to provide a recognizable transmission error indication to the client device. The host may then interpret and utilize the client device response to such transmission error signal, such as retransmission, to delay the flow of new data from the client. By repeating such action as needed, the host may unilaterally obtain an effect substantially equivalent to flow control, a data communication protocol feature that is unsupported by the client.

BRIEF DESCRIPTION OF THE DRAWINGS

Embodiments of the present invention will be more readily understood by reference to the following figures, in which like reference numbers and designations indicate like elements.

FIG. 3 is a timing diagram of a data transfer operation of the interface of FIG. 2.

FIG. 4 is a timing diagram as in FIG. 3, for the case of parity error.

FIG. 5 shows details of a host interface device and a host/client interface device pair similar to that shown in FIG. 2, modified to provide protection against buffer overflow.

DETAILED DESCRIPTION

Overview

Data communication interfaces are employed in innumerable circumstances. An exemplary embodiment set forth below may be employed in the context of a Removable User Identification Module ("R-UIM") interfacing with a computer device, which may be in a cellular telephone. The skilled person will understand, however, that the principles set forth herein may apply directly to any host-client interfacing device pair. Moreover, though the exemplary embodiment employs a single bidirectional communication connection, the skilled person will recognize that the method and apparatus described herein may apply to widely varying interface methods, such as parallel bidirectional interfaces, parallel unidirectional interfaces, and dual single-bit unidirectional interfaces. In particular, a method or apparatus as described herein may likely be employed whenever it is desired to obtain the advantages of interface features, such as flow control, which are not explicitly provided by one of a coupled pair of interface devices.

Figure 1:
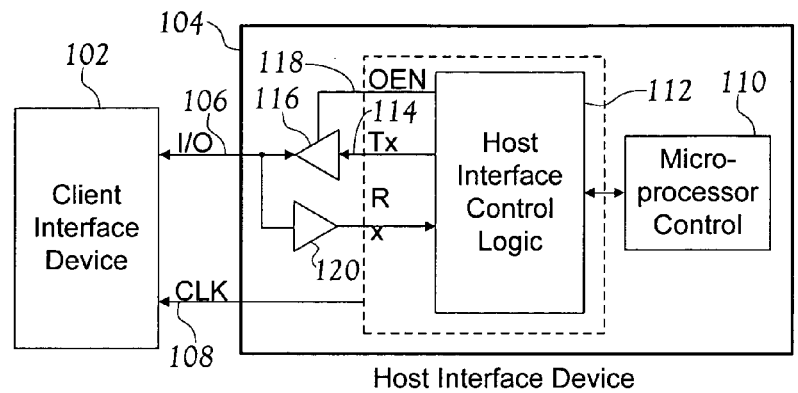
FIG. 1 is a block diagram showing a data communication connection between a client interface device and a host interference device.

FIG. 1 is a block diagram of a data communication connection between a client interface device 102 and a host interface device 104. The host device may, for example, be included as part of an integrated circuit associated with a computing device (not shown) that is part of a cellular telephone, while the client device may be a Removable User Identity Module (R-UIM). The illustrated data communication occurs on a bidirectional data connection 106 (input-output or "I/O" connection), with timing control provided by a synchronizing clock signal CLK 108. Under control of a microprocessor block 110, a Host Interface Control Logic block 112 may provide a Tx (transmit) data output 114 to an input of a buffer device 116. The Control Logic block 112 may also provide an Output Enable Control (OEN) signal 118 to the buffer device 116. The output of the buffer device 116 may be connected to the data input-output connection 106, as well as to an input buffer device 120.

Figure 2:
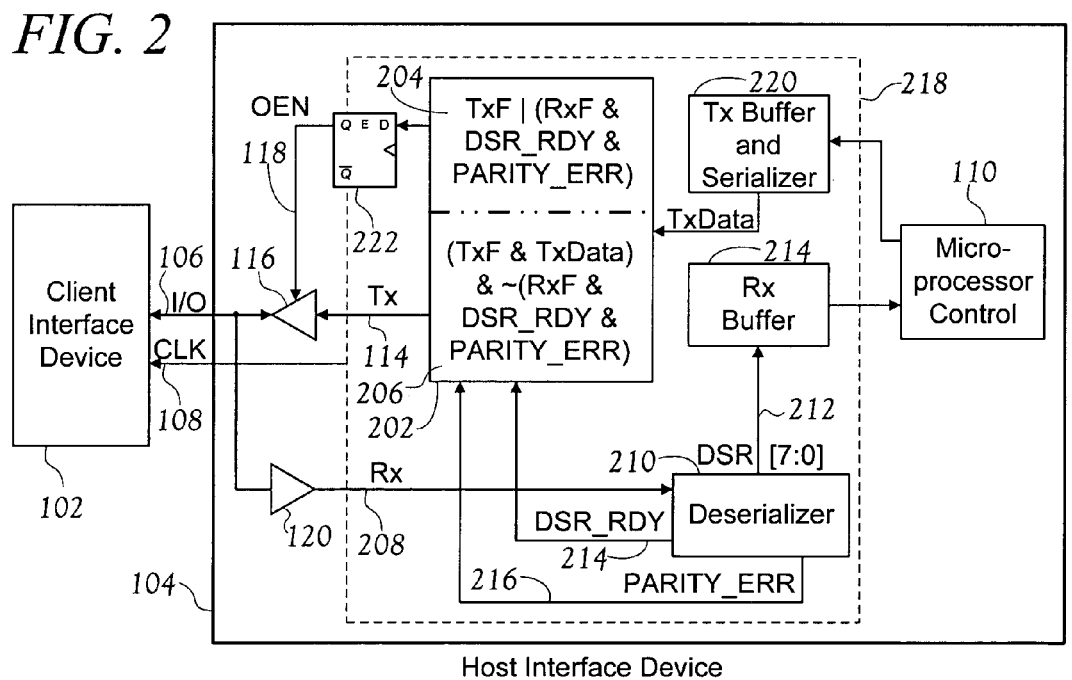
FIG. 2 shows exemplary details of the host interface device of FIG. 1.

FIG. 2 illustrates some details of a possible implementation of an interface as shown in FIG. 1. A transmit control logic block 202 may include Tx OEN logic 204 and Tx data logic 206. Logic for the logic block 202 is annotated according to a convention in which "|" indicates logical "OR," "&" indicates logical "AND," and "~" indicates logical inversion or "NOT." A "true" output from the OEN logic 204 may be clocked by the clocking signal CLK 108, onto the OEN signal connection 118 using a D-type register 222. This causes the logic value of the Tx output 114 to be driven onto the I/O connection 106 via the buffer 116.

In the exemplary embodiment, the TxF flag is set only when the host device is transmitting data. When TxF is true, RxF is false, and conversely when RxF is true, TxF is false. When the RxF flag is set the host is capable of receiving data. As indicated by the annotations within the Tx OEN logic block 204, a true (e.g., logic high) Tx OEN logic output may occur, in this example, when either the transmit flag TxF is set, and/or when a combination of a receive flag RxF, a deserializer ready signal DSR_RDY, and a parity error signal PARITY_ERR, are all set. Thus, as indicated by the annotations noted above and shown in FIG. 2, the output of the Tx OEN logic block 204 may be represented as: TxF | (RxF & DSR_RDY & PARITY_ERR).

The Tx output 114 may be provided to the buffer 116 as output by the Tx data logic block 206. The Tx output 114 may be true (e.g., logic high) when the signals TxF and transmit data TxData are true, and, moreover, when one of the signals RxF, DSR_RDY or PARITY_ERR are false (e.g., logic low). Thus, as indicated by the annotations noted above and shown in FIG. 2, the logic value of the Tx output 114 may be represented as: (TxF & TxData) & ~(RxF & DSR_RDY & PARITY_ERR).

A data communication control block 218 may be considered to include the Tx OEN logic block 204, the Tx data logic block 206, a deserializer 210, and an Rx buffer 214. A Tx buffer and serializer 220 will typically be included in the data communication control block 218 to provide data for transmissions from host to client. Timing for synchronization of the data transfers may be provided by the data communication control block 218 in the form of the clock signal CLK 108.

During typical receive operations, the host interface device 104 accepts data that has been provided by the client interface device 102 via the I/O connection 106. This data is then coupled to a receive data connection Rx 208 via the input buffer device 120. The deserializer 210 accepts serial bits on the connection Rx 208, and places them into successive parallel bytes on a deserializer output bus DSR[7:0] 212. The data transmitted via the deserializer output bus DSR[7:0] 212 may be stored in the receive buffer 214, from whence it may be retrieved by the microprocessor control 110. While placing the received data into parallel bytes for output, the deserializer 210 may also check parity, and/or may otherwise test the success of the received data transmitted from the client interface device 102. The deserializer 210 may, for example, provide a DSR_RDY signal 214 to the transmit control logic block 202. The DSR_RDY signal 214 may be true when the data DSR[7:0] 212 is ready, indicating that a complete byte has been received. The deserializer 210 may also provide a PARITY_ERR signal 216. The PARITY_ERR signal may be true when a parity error is detected in the completed byte.

FIG. 3 indicates exemplary data transfer timing for a typical operation of the interfaces of FIG. 2, in which a host interface device receives a byte of data from a client interface device, in the absence of a parity error. An OEN signal (118 in FIG. 2) remains "false" (e.g., logic zero) throughout, because the transmit flag TxF is false during this receive operation, together with at least the PARITY_ERR bit. A CLK signal (108 in FIG. 2) is provided by the host interface device while an I/O connection (106 in FIG. 2) initially is at a high impedance "z" state. As shown in FIG. 3, the client initiates transmission of a data sequence on the I/O connection by driving it to an appropriate level for a preliminary start bit "ST." As shown, the I/O connection 106 may be weakly pulled to a logic high during high impedance "z" conditions, in which case a logic low may be an appropriate logic level for the start bit.

Following transmission of the start bit, successive data bits D0, D1, etc., may be placed on the I/O connection after each rising edge of the CLK signal. The transmitted bits may be followed by integrity-check data, for example, by a single parity bit "PY." A DSR_RDY bit (214 in FIG. 2) may be set true when a complete sequence of bits has been received by the deserializer (210 in FIG. 2), and may be cleared when the output byte is accepted by the receive buffer (214 in FIG. 2). After transmitting the parity bit PY, the client may release the I/O connection, returning it to a high impedance "z" state so that the host can drive the I/O connection in order to indicate a transmission failure. In the absence of an indication of an error condition from the host, the client may begin transmission of the subsequent data sequence some time thereafter.

FIG. 4 indicates exemplary timing for an operation as described with respect to FIG. 3, except that a parity error (or other transmission error) is detected by the receive deserializer (210 in FIG. 2). The deserializer therefore sets a PARITY_ERR bit after the clock cycle during which the parity bit PY is received. The client, having driven the I/O connection during the data sequence transfer, thereafter presents a high impedance "z" to the I/O connection, permitting the host to initiate a reply transmission if needed.

Several consequences may ensue from the setting of the transmission error (PARITY_ERR) signal as shown in FIG. 4. For example, the DSR_RDY signal may not be cleared if the buffer does not acknowledge data that is apparently incorrect, and thus the DSR_RDY signal may remain asserted longer than it is in the "no error" sequence described above with respect to FIG. 3. The output from the Tx OEN logic block (204 in FIG. 2) will consequently be true, causing OEN to be asserted at the next appropriate edge of the clock signal. Upon the assertion of OEN, the Tx output (114 in FIG. 2), having an appropriate value to indicate an error flag "EF" (e.g., logic 0), will be driven on the I/O connection. The DSR_RDY and PARITY_ERR signals may be cleared when the error flag EF is output, clearing OEN at the end of the corresponding clock period. At this time, the I/O connection returns to a high impedance "z" state. The client may be configured to respond to the EF signal by beginning retransmission of the previous data sequence a predetermined number of clock cycles after EF has been asserted on the I/O connection. In an alternative configuration, the client may be configured to respond to the EF signal by beginning retransmission of the previous data sequence only after the I/O connection is returned to the high impedance "z" state (by the disabling of the OEN signal).

FIG. 5 is a block diagram of a host/client interface device pair as shown in FIG. 2, modified to provide protection against buffer overflow. Compared to FIG. 2, changes may be made in the host interface that permit the host to effectively provide an interface feature that is not explicitly supported by the client. In this exemplary block diagram, the client explicitly provides retransmission in response to an error indication transmitted from the host (e.g., "EF" in FIG. 4). However, in FIG. 5, the host is configured to utilize the retransmit response to effect flow control, even though the client need not explicitly support flow control. That is to say, the client need not accept and/or recognize a unique flow control signal from the host, and respond to such unique signal by suspending transmission, as would occur if the client supported the protocol. The host may realize the benefits of flow control such as freedom to service other time-critical hardware. The host may also have an ability to operate the interface at higher data rates, irrespective of an absence of explicit support for such flow control provided by the client.

The interface of FIG. 5 differs from the interface shown in FIG. 2 by the presence of a BUF_RDY signal 302 coupled from the Rx buffer 214 to the transmit control logic block 202, together with corresponding modifications to the Tx OEN logic 304 and the Tx data logic 306. In particular, the logic value of the output of OEN logic block 304 may be: TxF | (RxF & DSR_RDY & (PARITY_ERR |~BUF_RDY)). As compared to the output of the OEN logic block 204 described above with respect to FIG. 2, a false value for BUF_RDY will have substantially the same effect as a true PARITY_ERR signal.

The logic value of the Tx data logic block 306 may be: (TxF & TxData) & ~(RxF & DSR_RDY & (PARITY_ERR |~BUF_RDY)). This similarly differs from the output of the logic block 206 of FIG. 2, in that a false value for the BUF_RDY signal (i.e., "deassertion") has the same effect as a true PARITY_ERR signal.

Figure 6:
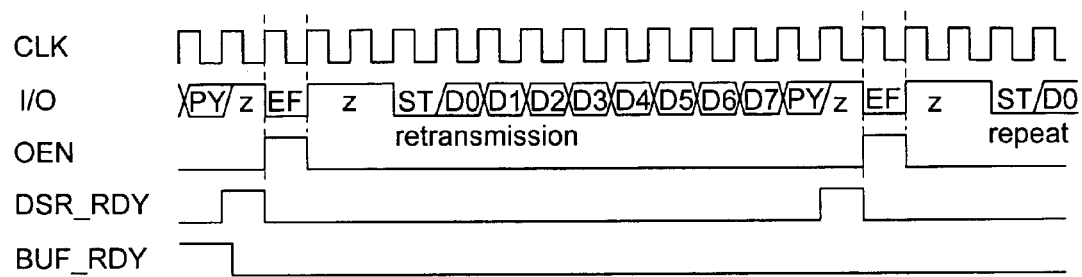
FIG. 6 is a timing diagram for an operation of the interface of FIG. 5.

FIG. 6 is a timing diagram showing an exemplary effect of a deasserted, or false, BUF_RDY signal. BUF_RDY may be deasserted any time that is early enough to cause the host to assert EF on the I/O connection. For example, as shown in FIG. 6, BUF_RDY is deasserted (e.g., set to logic zero) promptly following an assertion of the DSR_RDY signal (which may indicate the availability of a data byte that fills the last storage slot in the receive buffer). In the exemplary embodiment, DSR_RDY is asserted for one clock period after the parity bit PY is received. The presence of ~BUF_RDY and DSR_RDY causes OEN to be clocked true for one clock cycle, such that the OEN and I/O waveforms resulting from the false BUF_RDY signal are substantially identical to those shown in FIG. 4 (which result from asserting the parity error bit). Consequently, the host may similarly assert EF on the I/O connection for one clock period, regardless of whether such an assertion is in response to a deasserted BUF_RDY (i.e., to effect unsupported flow control), or in response to assertion of PARITY_ERR (i.e., to effect the supported protocol).

In alternative embodiments, however, in which the client does not require the waveform of EF to be limited to a single clock period, the length of the EF signal assertion may be varied. The host may then be designed such that the EF signal has a different length, perhaps depending upon whether the EF signal is asserted due to parity error, or due to buffer not ready, or for other reasons. EF may be somewhat shortened, or it may extended for any number of clock periods. In such alternative embodiments, for example, after EF has been asserted due to a false "buffer ready" signal, as illustrated in FIG. 6, the logic may be configured differently such that an EF assertion persists until BUF_RDY is no longer false.

Conclusion

The foregoing description illustrates exemplary implementations, and novel features, of aspects of a method and apparatus for effectively providing data communication protocol features that may not be supported by a client interface device. Given the wide scope of potential applications, together with the flexibility inherent in digital design, it is impractical to list all alternative implementations of the method and apparatus. Therefore, the scope of the presented invention should be determined only by reference to the appended claims, and should not be limited by features illustrated or described herein except insofar as such limitation is recited in an appended claim.

While the above description has pointed out novel features of the invention as applied to various embodiments, the skilled person will understand that various omissions, substitutions, and changes in the form and details of the methods and apparatus illustrated may be made without departing from the scope of the invention. For example, logic levels may be inverted, and communication timing may be altered, as is convenient for a particular system. A single bidirectional signal connection is described, but a parallel bus may be used. Data connections may be made unidirectional, if preferred, with corresponding changes in logic. Logic functions may be changed as needed. Despite the illustration of electrical signals being conveyed between the host and client, the interface may employ alternative communication channels, such as light (e.g., fiber optic) or radio channels. Moreover, though connections are shown only between the host and the client, the connections may in fact form a bus that is connected to other devices as well, whether these devices are actively involved in the communication or not. These and other changes in logic or architecture constitute alternative embodiments of the described method or apparatus.

Alternative logic signals may be employed if they are compatible with the client configuration. For example, the signal OEN is shown as being set a full clock period delay after the end of the parity bit clock period, but such delay may be increased, or may be decreased to zero. Moreover, the I/O connection need not be held at error flag EF value for just one clock cycle, as shown, but may be any number of clock cycles. For example, after the OEN signal is set true and I/O is set to an error flag value in response to a false BUF_RDY signal, those values may persist as long as BUF_RDY remains false.

The terms of "client" and "host" are used for convenience of exposition, with emphasis placed upon the host receiving data from the client. However, the nomenclature may largely be applied arbitrarily to two devices in data communication. The host may primarily transmit data. Additionally, a variety of protocol features explicitly supported by a client may be invoked by the host to effect different features that are not necessarily supported by the client. An example is briefly set forth below, to illustrate that widely diverse data communication methods may constitute embodiments of the method and apparatus described herein.

According to this example, a client receiving data from a host may be configured, in accordance with a supported protocol, to respond predictably to a parity bit that fails to accord with preceding data by demanding retransmission. In addition to utilizing such protocol support to correct an inadvertent transmission error, a host may be configured to further employ the protocol response to effect a "standby" protocol that is not explicitly supported by the client. The communication channel may be held open, in accordance with a "standby" protocol, avoiding buffer underflows or channel re-initiation requirements. Thus, if the host has an empty transmit buffer, but would benefit by not terminating the transmission, invocation of such a standby protocol may be desirable. Even if the client does not recognize a "standby" request signal, nor respond thereto, the host may nonetheless mimic the standby protocol by invoking the supported retransmission protocol. In this case, the host may take advantage of the predictable retransmission demand that the client will initiate, due to the supported retransmission protocol, by transmitting data that intentionally is inconsistent with the subsequent parity bit.

Each practical and novel combination of the elements and alternatives described hereinabove, and each practical combination of equivalents to such elements, is contemplated as an embodiment of the invention. Because many more element combinations are contemplated as embodiments of the invention than can reasonably be explicitly enumerated herein, the scope of the invention is properly defined by the appended claims rather than by the foregoing description. All variations coming within the meaning and range of equivalency of the various claim elements are embraced within the scope of the corresponding claim. Each claim set forth below is intended to encompass any apparatus or method that differs only insubstantially from the literal language of such claim, as long as such apparatus or method is not, in fact, an embodiment of the prior art. To this end, each described element in each claim should be construed as broadly as possible, and moreover should be understood to encompass any equivalent to such element insofar as possible without also encompassing the prior art.

What is claimed is:

1. A method of effecting a substitute for a data communication target protocol in communications between a host interface device and a client interface device, the method comprising:
   a) selecting a first protocol that is supported by the client, such that a first predetermined data and control signal sequence conveyed to the client from the host predictably elicits a response from the client that accords with the supported protocol, wherein the predetermined data and control signal sequence is initiated by the host to invoke the supported protocol;
   b) selecting a different second protocol that is unsupported by the client in that the host does not have access to a unique data and control sequence that will predictably elicit a response, required by such unsupported protocol, when conveyed from the host to the client;
   c) determining a need for invocation of the second protocol to effect a particular function in the host that is not explicitly effected by the supported protocol;
   d) conveying the first predetermined data and control signal sequence from the host to the client;
   e) receiving a response to the host from the client that accords with the supported protocol; and
   f) interpreting the response, within the host, to approximately effect the particular function in the host.

2. The method of claim 1, wherein the first protocol is a data retransmission protocol in which the client retransmits a block of data as a predictable response to an indication of transmission error provided by the host.

3. The method of claim 2, wherein the different second protocol is a flow control protocol in which the host causes the client to temporarily suspend new data transmissions.

4. The method of claim 3, wherein step c) includes determining a need to interrupt data flow despite an absence of recognizing a transmission error, and step d) includes conveying an indication of transmission error from the host to the client.

5. The method of claim 4, further comprising repetitively performing step (d) to effect a plurality of temporally contiguous invocations of the first protocol.

6. The method of claim 1, wherein the different second protocol is a flow control protocol in which the host causes the client to temporarily suspend new data transmissions.

7. The method of claim 6, further comprising repetitively performing step (d) to effect a plurality of temporally contiguous invocations of the first protocol.

8. A host interface device apparatus for controlling data transfers between the host interface device and a client interface device, comprising:
   a) host logic configured to cause transmission to the client of a control data sequence predetermined to invoke a first data communication protocol response from the client;
   b) a triggering host signal indicating a need for invocation of a different second data communication protocol from the client; and
   c) host logic configured to cause transmission to the client of the predetermined data sequence to invoke the first data communication protocol response from the client in response to both of
      i) a host need to invoke the first protocol, and
      ii) the triggering host signal for the second protocol in an absence of (c)(i).

9. The apparatus of claim 8, wherein the predetermined data sequence caused by host logic (c) is substantially identical whether caused in response to condition (c)(i) or in response to condition (c)(ii).

10. The apparatus of claim 8, further comprising:
   d) a bidirectional data connection I/O for coupling the host to the client; and
   wherein the host logic (a) is further configured to assert an error bit on the bidirectional I/O connection to invoke the first data communication protocol response from the client.

11. The apparatus of claim 8, wherein the second protocol is a flow control protocol in which the client temporarily suspends transmission of new data to the host.

12. The apparatus of claim 11, wherein the first protocol is a retransmission protocol in which the client retransmits a previously transmitted data sequence to the host.

13. The apparatus of claim 12, further comprising a host received data error determination block configured to identify discrepant received data as erroneous, and to indicate a host need to invoke the first protocol in response to receipt of such discrepant data.

14. The apparatus of claim 13, wherein the triggering host signal (c)(ii) is a buffer not ready signal.

* * * * *